Nov. 16, 1965  W. WILSMANN ETAL  3,217,982
APPARATUS FOR THE STERILIZATION OF LIQUIDS
Filed Oct. 17, 1958  2 Sheets-Sheet 1

INVENTORS
WILHELM WILSMANN
KARL MEIS

BY Burgess, Dinklage & Sprung
ATTORNEYS

United States Patent Office 3,217,982
Patented Nov. 16, 1965

3,217,982
APPARATUS FOR THE STERILIZATION
OF LIQUIDS
Wilhelm Wilsmann and Karl Meis, Oelde, Westphalia,
Germany, assignors to Westfalia Separator A.G., Oelde,
Westphalia, Germany, a German corporation
Filed Oct. 17, 1958, Ser. No. 767,840
1 Claim. (Cl. 233—47)

This invention relates to the sterilization of liquids.

The sterilization of liquids is of great importance particularly in the food and beverage industry. Complete sterilization is not achieved in the presently customary processes nor is it in general absolutely necessary. The purpose of the sterilization measures is normally to reduce the number of bacteria in the beverage intended for human consumption to such an extent that all effects which are injurious to health are excluded. At the same time, the reduction of the bacteria count considerably increases the keeping properties of such beverages, for instance, fruit and vegetable juicies, milk and the like.

The bacteria count, which is generally given per cc. of liquid, can be reduced in various manners, either by killing the bacteria or by their mechanical separation from the liquid.

In accordance with one known method, sulfur dioxide is added to wine and fruit juices, for instance, in order to increase their keeping properties. Since it forms sulfurous acid in the presence of water, which acid is injurious to the health in higher concentrations, the amount of this addition is limited by law.

Other liquids, such as beer, sparkling wine or the like, are maintained under a carbon-dioxide pressure of several atmospheres in order to improve the shelf life of these beverages. In this way, the bacteria are, to be sure, not killed in large quantities, but nevertheless their activity is so greately retarded that any noticeable propagation is prevented.

Far more customary than the methods which have just been mentioned is the pasteurizing of liquids. This consists in maintaining the liquid for a given period of time at elevated temperature in order in this way to kill the greater part of the bacteria contained in it.

Disadvantages of pasteurization are the retention of the killer bacteria in the liquid and the destruction of a part of the vitamins and of the taste and aromatic substances, whereby the natural taste of the beverage is impaired. The destruction of the aromatic substances naturally increases with an increase in temperature and of the time of pasteurization.

The separation of the bacteria from a liquid by mechanical means is possible due to the fact that they are seated, at least to a greater part, on impurities which are contained in the liquid as a result of its preparation. Therefore, this part of the bacteria can be removed from the liquid by mechanical purification together with the solids.

Insofar as a filter is used for the purification of a liquid, the predominant part of the germ-carriers remains on the filter layer together with the bacteria which adhere to them. Now, however, a filter is a separating device and is responsive to the size of the solid particles. Depending on the mesh size of the filter cloth or on the pore size of the filter layer, the solids are retained down to very specific dimensions while the smaller particles pass unimpeded through the filter together with the bacteria adhering to them. It is furthermore assumed that the further flow of liquid again carries along with it a part of the bacteria which were deposited out since the bacteria-removal effect of a filter is less than the effect corresponding to the quantity of solids removed.

The separating effect of a centrifuge is based, in contradistinction to a filter, in principle on the difference between the specific gravity of the individual components, but still it is not possible even with centrifuges to remove solids which are in themselves of higher specific gravity from the carried liquid down to the smallest dimensions.

Since both with filters and with centrifuges alone a satisfactory separation and a sufficient removal of the bacteria could not be obtained, the method was employed for a long time of providing a heater after the mechanical separating device. This combination has the advantage that due to the mechanical purification and preliminary sterilization the affecting of the taste of the liquid by the dirt substances is extensively done away with and the number of killed bacteria in the pasteurized liquid is reduced.

Nevertheless, the number of killed bacteria in the liquid which has been treated in this manner is still very high and the damage to the aromatics by the pasteurization is not avoided.

If a suspension which contains solid particles of different size and different specific gravity is subjected to gravity settling, the largest and heaviest particles separate out in accordance with Stoke's law in a relatively short period of time on the bottom of the vessel while the finer lighter particles and the suspended particles require a considerably longer settling time, which may amount to days or weeks. The layer of solids is relatively firm at the bottom of the vessel and becomes looser and looser with an increase in height.

When centrifuging such a suspension in a purifying drum, the solids separate out in the same way. Even with a centrifugal acceleration of 10,000 $g$, the time of stay of the liquid in the bowl is still much too short for the lighter and smaller particles to be able to move over the distance to the wall of the bowl. Even lengthening the time of stay several times by reducing the throughput would not lead to a complete removal by centrifuging of all solid particles, aside from the fact that with such a low throughput, the use of a centrifuge would no longer be economical.

A disc inset has the purpose of breaking up the material to be centrifuged which flows into the separating space of the bowl into a plurality of thin layers. In this way, the path which the components must traverse for their separation will be very short. The lighter components travel inward on the top of the discs while the heavier travel outward on their bottom. If it is assumed that upon the centrifuging of a suspension, the separation of solids and carrier liquid in the disc set is complete, then even the finest solid particles pass first of all into the space outside the disc set. Here the separation takes place considerably more slowly, despite the higher centrifugal acceleration, as a result of the long path from the outer edge of the disc to the inner wall of the bowl, and as a result of the eddying caused by the disc edges, by which eddying the finer solids are held in rotating motion. During the centrifuging, the suspension which is enriched in finer solids increases in volume outside of the disc inset so that this ring finally penetrates into the disc set. In this connection, the fine solid particles are entrained by the inward directed flow, whereby the separation obtained is in part again destroyed.

In order to prevent this remixing and conduct the portion of the liquid of high bacteria content towards the outside, there have already been employed nozzle drums, which, as is known, make possible a continuous removal of the solids together with a part of the liquid. Since, however, in general, the solid content and the portion of liquid of high bacteria content is low in the case of the beverages to be purified, while on the other hand, the liquid pressure at the periphery of the bowl is very high, even with minimum diameter of the nozzles, a considerably greater quantity of liquid is centrifuged out than would per se be necessary; in other words, a large quantity of useful liquid is lost. Upon the centrifuging, it is so intimately mixed with the bacterial sludge as a result of the high pressure that the recovery in general is not possible. Furthermore, when employing nozzle centrifuges, there is also disadvantageous the strong formation of mist caused by the vigorous impacting of the liquid in the collector vessel. This mist soon fills the entire working room and furthermore contains bacteria.

The present invention is based on the concept of continuously or intermittently withdrawing liquid composition enriched with finer solids and bacteria from the space outside of the disc set and flowing it to the vicinity of the bowl axis, and there removing it from the centrifuge. In this way the amount of finer solids and bacteria enriched liquid composition adjacent the outer periphery of the disc set is reduced so that the tendency of this material to penetrate between the discs and interfere with the centrifuging is successfully combatted. The quantity of the finer solids and bacteria enriched portion necessary to withdraw in order to prevent this penetration is small and hence the loss of useful liquid is not substantial. Thus, according to the invention, undesired penetration of the disc set is prevented without the expenditure of a large proportion of useful liquid as is the case, for example, when nozzle drums are employed to control the concentration of finer solids and bacteria enriched material adjacent the disc set. An advantage of the invention is that no mist forms even upon free emergence of the enriched material from the centrifuging as the finer solids and bacteria enriched material is discharged from centrifuging adjacent the bowl axis.

Thus, the invention provides a method of separating bacteria from a liquid composition which comprises continuously introducing the composition into a rotatably mounted vessel, and centrifuging the liquid composition in the vessel so as to divide it into a bacteria depleted fraction which forms adjacent the centrifuging axis and a bacteria enriched fraction which forms outwardly of the bacteria depleted fraction. Bacteria depleted fraction is continuously withdrawn from the vessel and bacteria enriched fraction is separately withdrawn to maintain the bacteria count of the bacteria depleted fraction at a predetermined level. Solid particles present in the liquid composition, particularly larger solid particles, are divided during the centrifuging as a solid particle rich fraction having a high bacteria concentration which accumulates adjacent the outer periphery of the vessel leaving the bacteria enriched fraction intermediate this solid particle rich fraction and the bacteria depleted fraction.

Advantageously, centrifuging according to the invention is combined with heating of the material to improve the effectiveness of the treatment. The heating of the liquid to be centrifuged has the purpose to lower the viscosity of the liquid and thereby to increase the clarifying performance of the centrifuge. For milk, the preheating temperatures may lie between 35 and 60° C. The duration of heating is very short, because it is only necessary to bring the liquid to this temperature. A pasteurization is not to be reached. The liquid can then be centrifuged according to the invention. Following the centrifuging, the recovered liquid can be cooled immediately to a storage temperature and the finer solids and bacteria enriched material withdrawn from outside of the disc set during the centrifuging, can, if desired, be heated to a high temperature to free it of bacteria.

The effectiveness of the method under the invention is very high. In milk, for instance, far more than 90% of the bacteria are removed.

Centrifugal separators, according to the invention, are shown in the accompanying drawing. These illustrations of the invention are set forth as embodiments thereof, and it is not intended that they should be interpreted as defining limitations of the inventions. In the drawings.

Figure 1:
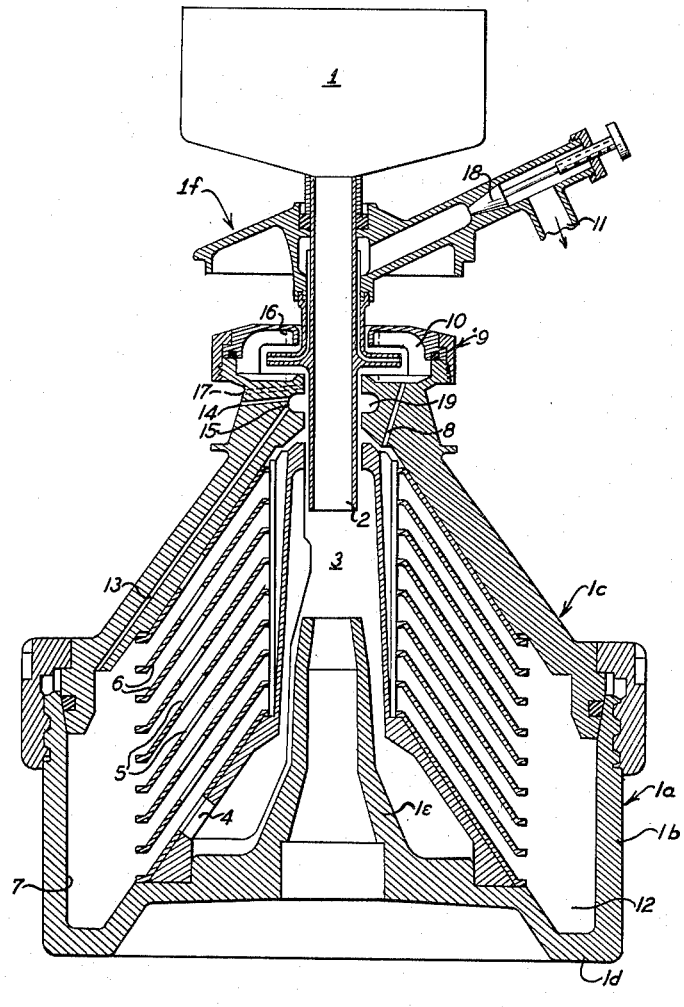
FIG. 1 depicts a separator according to the invention and provided with a paring disc to remove from the centrifuge purified liquid.

Referring to FIG. 1, the separator there shown comprises a bowl 1a, including side walls 1b, cover 1c, and bottom 1d. The bottom of the bowl is formed to provide a spindle housing 1e, formed to receive a rotatable spindle (not shown) suitable to provide the motion for the desired centrifuging. Mounted adjacent the bowl cover 1c, is a non-rotatably mounted separator head, 1f.

Within the bowl, symmetrically disposed, are a plurality of frusto conical discs 6. The discs are disposed in spaced relationship with respect to each other, and coaxially with respect to the bowl axis and extend radially outward from adjacent the bowl axis and terminate radially inwardly of the bowl side walls 1b, whereby free annular space 12 is provided within the bowl adjacent the side walls thereof.

In operation, liquid composition including material of different gravity is deposited in feed vessel 1, attached to separator head 1f and flows through feed pipe 2 into the inlet space 3 within the bowl. From the inlet space 3, the liquid composition flows through riser channel 4, and then through the openings 5 in the discs 6, and then divides into a plurality of superposed, frusto conical shaped layers, divided by the discs 6. Upon centrifuging a specifically heavier fraction enriched in impurity flows outwardly through the layers disposed between the discs 6 and discharges from between the discs 6 at the outer peripheries thereof and is deposited within the annular space 12. Simultaneously, a specifically lighter fraction depleted in impurity, flows inwardly through the layers toward the axis of the vessel. As has been done heretofore, the heavier and larger solids constituting impurity, are allowed to deposit on the inner surface 7 of the bowl side walls 1b, and specifically lighter fraction which flows to adjacent the bowl axis is continuously withdrawn from the bowl. The specifically heavier fraction accumulates in the annular space 12 and tends to back-flow into the layers disposed between the discs 6 and thus to contaminate specifically lighter fraction flowing inwardly through said layers. To prevent this back-flowing, according to the invention, specifically heavier fraction is withdrawn from the annular space 12, and passed through a hermetically sealed path to adjacent the bowl axis and is there discharged from the centrifuge at a controlled rate. Thus, the tendency of the specifically heavier fraction to back-flow is effectively combatted.

According to the invention, the specifically lighter fraction and the specifically heavier fraction are discharged from the centrifuge at about the same radial distance from the axis of the bowl, and the rate at which specifically heavier fraction is discharged is controlled by throttling the discharge pressure of the specifically lighter fraction.

Means suitable for discharging specifically lighter fraction are a paring disc having a throttle member connected in the discharge line from the paring chamber, or a valved conduit hermetically connected with the bowl. Means suitable for discharging specifically heavier fraction are a free overflow edge, a paring disc, or a hermetically closed discharge line which is advantageously provided with a throttling member. To provide the desired discharging of the specifically lighter fraction and the specifically heavier fraction at about the same radial distance from the bowl axis, when the specifically lighter fraction is discharged by a paring disc, and the specifically heavier fraction is discharged over a free overflow edge, the overflow edge should lie approximately at the same radial distance from the bowl axis as the free liquid surface in the paring chamber in the case of foam-free discharge of the specifically lighter fraction. When both fractions are discharged by paring discs, the inlet opening into the paring chamber for the specifically heavier fraction should be approximately at the same distance from the axis of the bowl as the free liquid surface in the paring chamber for the specifically lighter fraction in the case of foam-free discharge. When the discharge of the specifically lighter fraction is by means of a valved line hermetically connected to the rotating bowl, and the discharge of the specifically heavier liquid is by a free overflow edge, the free overflow edge should be approximately at the same radial distance from the axis of the bowl as the radial inner liquid level in the hermetically closed discharge line for the specifically lighter fraction. When the discharge of both fractions is by means of a hermetically sealed line connected to the bowl, each of the lines should be provided with a throttle member.

Since the difference in specific gravities of the fractions is extremely small, during operation without throttling the specifically lighter liquid discharge line, the specifically heavier fraction will extend radially inwardly along the hermetically sealed path from the annular space 12 of the bowl to near the place of discharge for this fraction. Hence, by throttling the discharge for the specifically lighter liquid, the level of the specifically heavier liquid can be displaced towards the bowl axis causing the desired discharge of specifically heavier fraction. Then the rate of discharge of specifically heavier fraction can be controlled by manipulation of the throttling member in the specifically lighter fraction discharge line.

The throttle member can be permanently set or can be adjusted from time to time, either automatically or by hand.

It is also possible to control the discharge rate of the specifically heavier fraction by regulating the quantity of feed. It is preferred, however, to obtain the desired control by regulating the pressure rate of discharge of the specifically lighter fraction.

In the embodiment shown in FIG. 1, the means for discharging the specifically lighter fraction is a paring disc and the means for discharging specifically heavier fraction is a free overflow edge. The specifically lighter fraction flows radially inwardly and passes through channel 8, into the paring chamber 9, from where it is removed from the centrifuge by entrance into paring channels 10 and passage through the discharge line 11. Specifically heavier fraction in the annular space 12 passes through hermetically sealed openings 13 to adjacent the bowl axis and then issues into annular space 19 from where it flows over overflow edge or weir 15 and then passes through openings 14 into a collector vessel (not shown). Bore 17 serves for venting of the inlet space. The overflow edge 15 lies approximately at the same radial distance from the axis of the bowl as the liquid level 16 in the paring chamber 9. By means of throttle member 18, the liquid level 16 in the paring chamber 9, and in the annular space 19, can be shifted so that a larger or smaller quantity of specifically heavier liquid can be discharged from the bowl via the overflow edge or weir 15.

Figure 2:
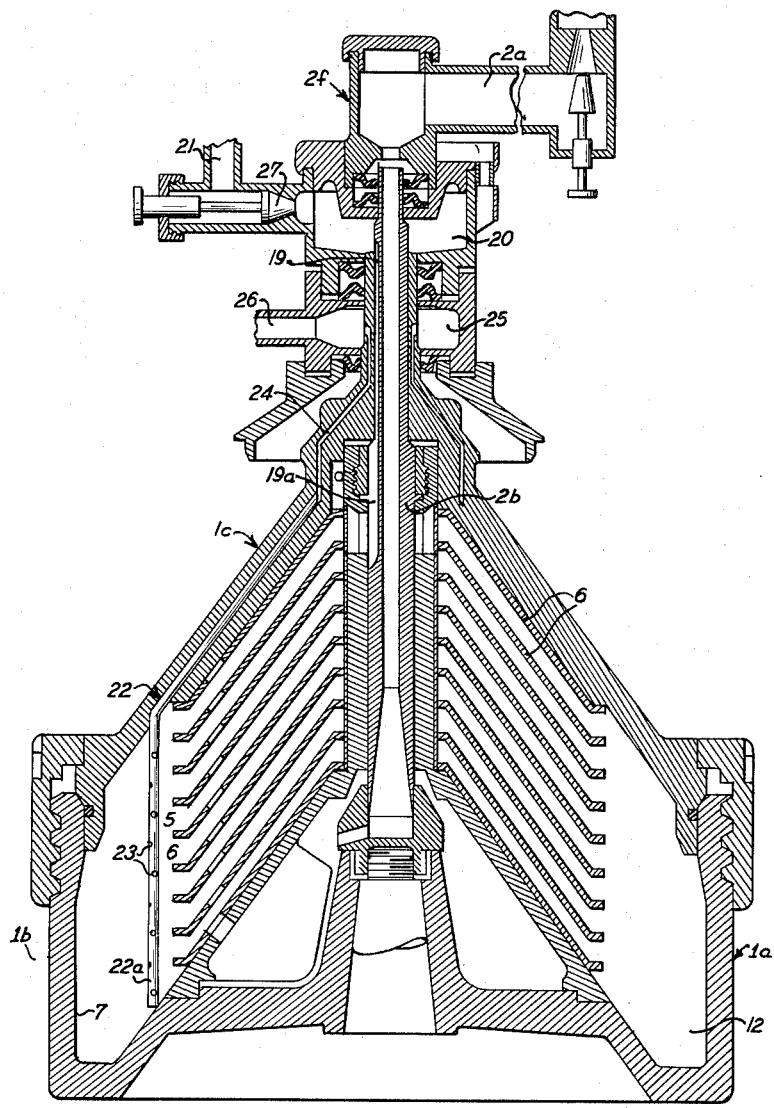
FIG. 2 depicts a separator according to the invention and provided with a hermetically sealed discharge line for removing purified material from the centrifuge.

Referring to FIG. 2, in the case of the separator there shown, the specifically lighter fluid is discharged through a hermetically sealed discharge line having a throttling member connected therein and the specifically heavier fluid is also discharged through a hermetically sealed line. Liquid composition to be purified, flows through piping 2a which interconnects a source of a supply (not shown) and the separation head 2f. From the separator head 2f, the liquid composition discharges into feed pipe 2b which is mounted to rotate with the bowl. The liquid composition is separated within the bowl into a specifically heavier fraction and a specifically lighter fraction in the same way that separation is effected in the case of the bowl shown in FIG. 1. For flowing specifically heavier fraction from annular space 12 to adjacent the bowl axis, a hermetically sealed tube 22 is provided. A portion 22a of the tube 22 is disposed in the annular space 12 spaced from the disc 6 and parallel to the axis of the bowl. Openings 23 are positioned at spaced intervals along the portion 22a of the tube. Preferably at least some of the openings 23 are disposed adjacent the bowl side walls. Openings so disposed are desirable as they are not likely to become closed by reason of large impurity particles lodging in them. The tube 22 passes from over the annular space 12 radially inwardly through the bowl cover 1c. The tube 22 conveys specifically heavier fraction to channel 22 which in turn conveys the fraction to annular chamber 25. In the annular chamber 25, the fraction is withdrawn from centrifuging by discharge line 26. Specifically lighter liquid passes through channel entrance 19a and thence through channel 19, and into annular chamber 20, from where it is removed from centrifuging by discharge line 21. The quantity of specifically heavier fraction discharged through line 26 can be controlled by manipulation of the throttle member 27.

Various modifications of the separators shown in the drawing can be made. Thus, for the discharge of specifically heavier fraction there can be provided in the case of the bowl shown in FIG. 1 a second paring disc and in accordance with the separator according to FIG. 2 a second discharge line which is hermetically connected with the bowl. In the last mentioned case, a throttling member should also be provided in the discharge line. Also, the hermetically sealed path for specifically heavier liquid to adjacent the bowl axis can be defined by an imperforate member disposed transversely of the bowl axis above the discs 6 and radially outwardly thereof so as to provide a passageway intermediate the imperforate member and the bowl cover. In effect, the construction of the separator shown in FIG. 1 is of this specification, the portion of the cover 6 inwardly of the openings 13 constituting such an imperforate member. If desired, the imperforate member can be a separate disc placed in abutting relation with the cover and having grooves cut into it from its cover side surface. The design of the hermetically sealed path or paths from the annular space 12 are of sufficient cross-sectional area so that despite the small quantity of liquid flowing therethrough, large flow velocities are produced and deposits of solids within the passageways are prevented.

*Example*

In plate (disk) centrifuge of 320 mm. diameter and a number of revolutions of 7,000 r.p.m. a milk preheated to 55° C. was centrifuged. The bacterial count amounted in the preheated milk to 240,000 per cm$^3$. The milk with a concentration of bacteria and separately drawn from the centrifuge amounts to approximately 1% of the quantity treated. In this portion the bacteria count was 23.7 x 10$^6$ per cm$^3$, in the cleaned milk 3065 per cm$^3$.

We claim:

A centrifugal separator comprising a rotatably mounted bowl having side walls, a plurality of frusto conical discs disposed coaxially within said bowl at spaced intervals extending radially outwardly from adjacent the bowl axis terminating radially inwardly of the bowl side walls forming an annular space within the bowl adjacent the side walls thereof, means for rotating said bowl whereby liquid compositions centrifuged in said bowl are separated into a solid-enriched fraction which is deposited in said annular space and a specifically solid-depleted fraction which is deposited adjacent the bowl axis, a tubular member having its lower portion disposed parallel to the bowl axis in said annular space with openings therein adjacent the bowl side walls and having its upper portion extending as a hermetically sealed line provided at its terminus with discharge means for said solid enriched fraction, means comprising a hermetically sealed path provided with throttle means externally adjustable during operation of the separator for discharging the solid depleted fraction from the centrifuge adjacent the bowl axis, said discharge means for said tubular member being positioned at a radial distance from the bowl axis about equal to the radial distance from the bowl axis at which the solid depleted fraction is discharged from the centrifuge.

References Cited by the Examiner
UNITED STATES PATENTS

| | | | |
|---|---|---|---|
| 1,504,197 | 8/1924 | Davis | 99—212 |
| 1,861,896 | 6/1932 | Ayers | 233—29 |
| 2,019,944 | 11/1935 | Walch | 233—11 |
| 2,043,350 | 6/1936 | Forsberg | 233—46 XR |
| 2,139,715 | 12/1938 | Bergner | 233—22 |
| 2,197,911 | 4/1940 | Andersson | 233—22 |
| 2,261,394 | 11/1941 | Lindgren | 233—22 XR |
| 2,266,554 | 12/1941 | Jones | 233—29 |
| 2,302,512 | 11/1942 | Wilsmann | 233—22 |
| 2,313,541 | 3/1943 | Flowers | 233—29 XR |
| 2,344,888 | 3/1944 | Lindgren | 233—46 XR |
| 2,369,822 | 2/1945 | Flowers | 233—29 |
| 2,657,803 | 11/1953 | Schutte | 233—46 XR |
| 2,726,808 | 12/1955 | Fitzsimmons | 233—19 |
| 2,761,618 | 9/1956 | Fitzsimmons | 233—19 |

OTHER REFERENCES

"Removal of Bacterial Cells From Liquid Media Using a Foerst Continuous-Type Centrifuge," by Weeks et al., published in Journal of Bacteriology, vol. 71, pages 127–128, January 1956. A copy of the article is also located in Division 43, class 167/78 PHY.

M. CARY NELSON, *Primary Examiner.*

CARL F. KRAFFT, HERMAN BERMAN, HERBERT L. MARTIN, *Examiners.*